Jan. 13, 1931.                G. S. KECK                1,788,917
                           DIRIGIBLE HEADLIGHT
                         Filed Aug. 17, 1926         3 Sheets-Sheet 1
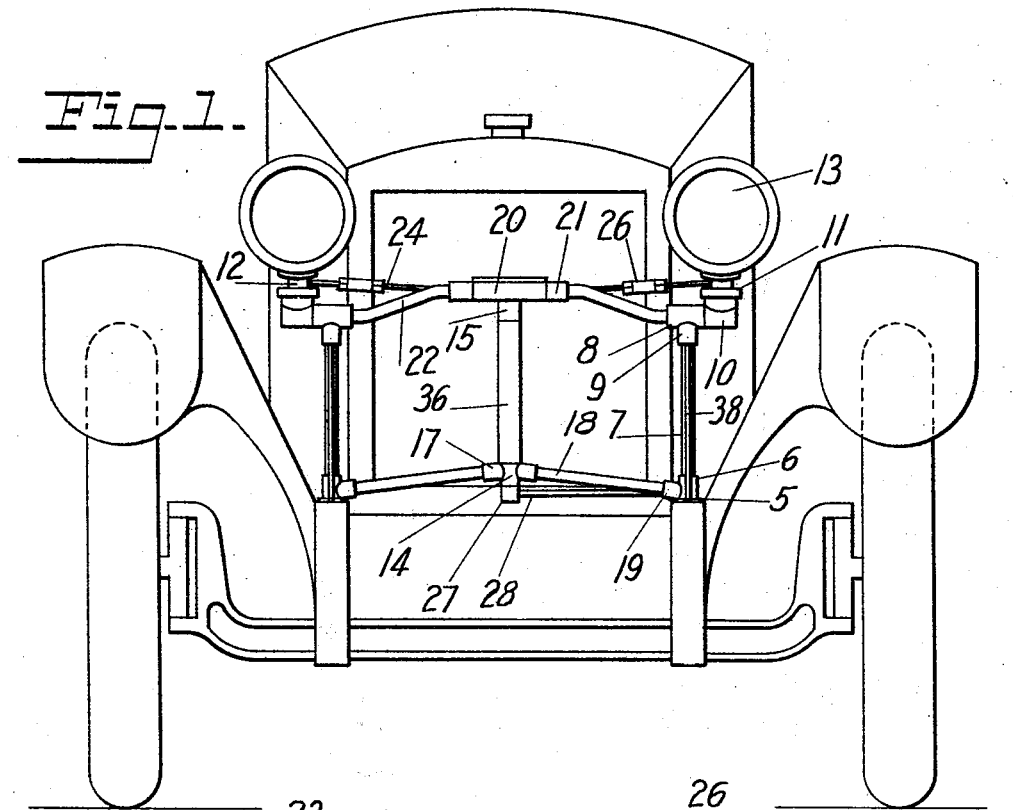
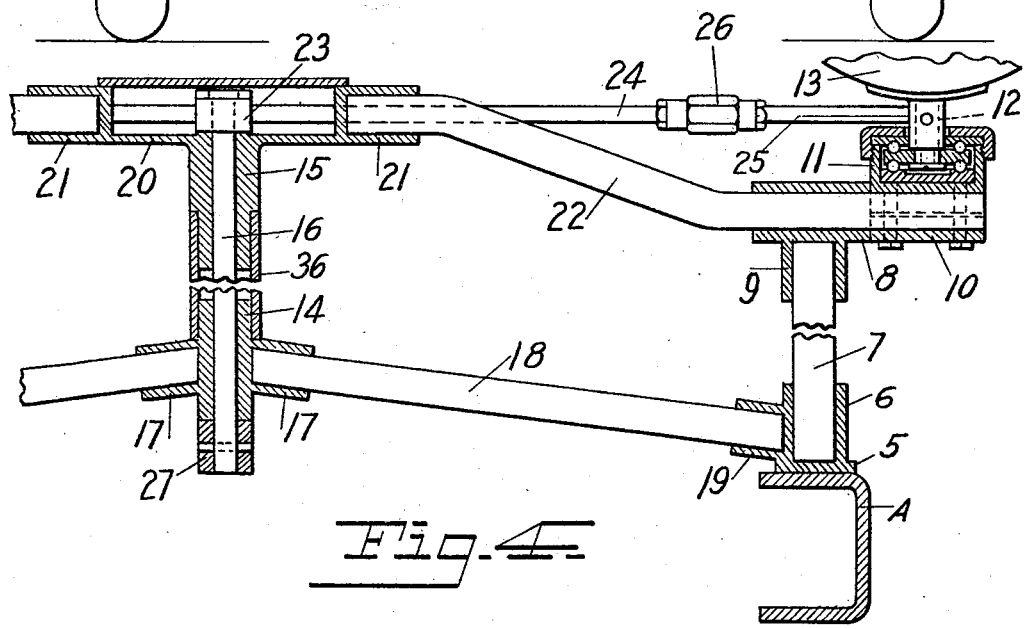
INVENTOR.
GEORGE S. KECK.
ATTORNEY.

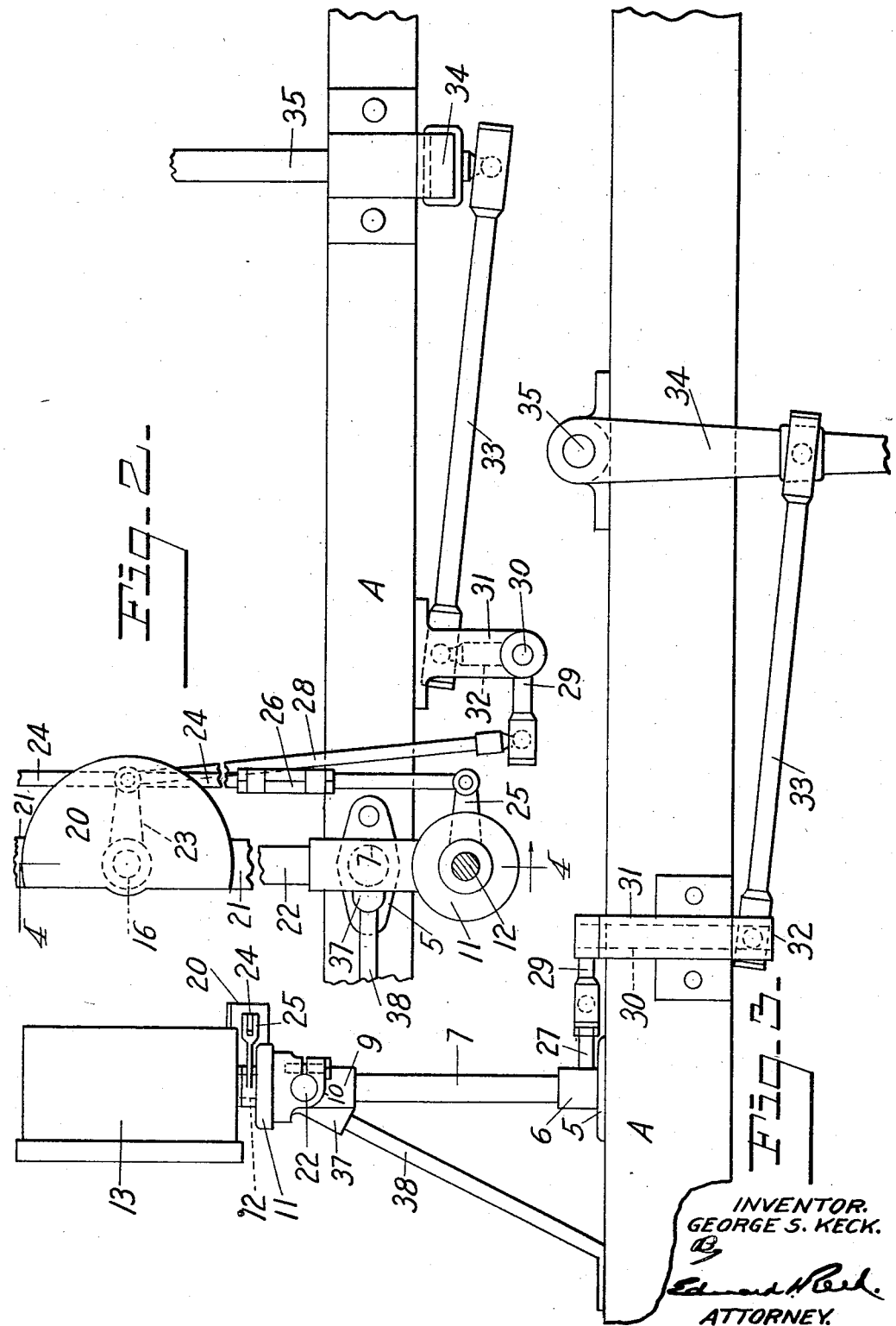

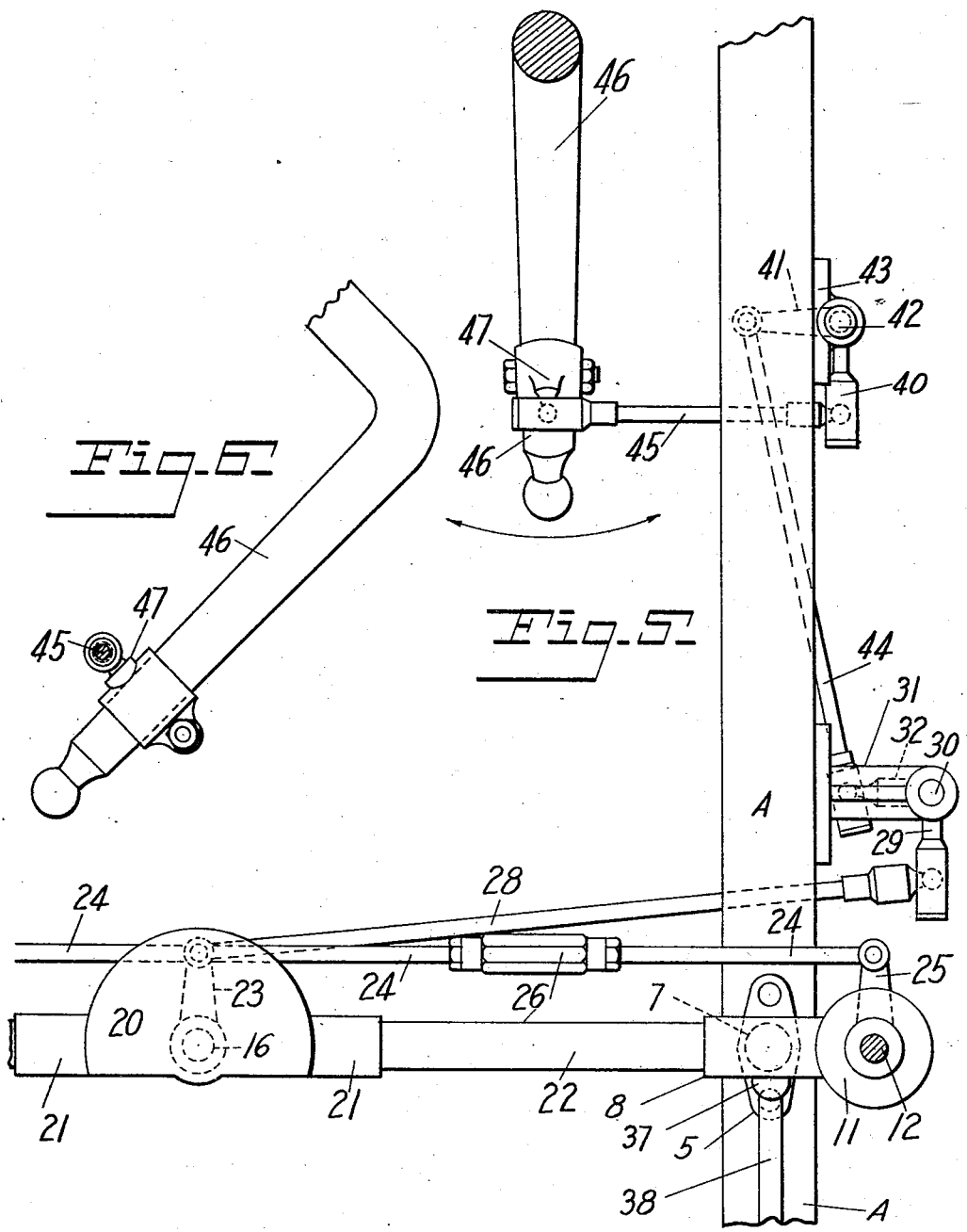

Patented Jan. 13, 1931

1,788,917

UNITED STATES PATENT OFFICE

GEORGE S. KECK, OF PASADENA, CALIFORNIA, ASSIGNOR TO PILOT RAY CORPORATION, OF WILMINGTON, DELAWARE, A CORPORATION OF DELAWARE

DIRIGIBLE HEADLIGHT

Application filed August 17, 1926. Serial No. 129,845.

This invention relates to dirigible headlights and more particularly to a supporting and operating mechanism whereby dirigible lamps may be mounted on an automobile and controlled by the steering mechanism thereof.

One object of the invention is to provide a mechanism of this kind by means of which the headlights and their operating mechanism may be supported wholly by the frame or other parts of an automobile which are carried by the springs, thus avoiding the use of extensible or flexible connections between the steering mechanism and the headlights, such as are necessary when the lamps are mounted on the frame or fenders and the operating mechanism is carried in part by the axle.

A further object of the invention is to provide such a mechanism which will be of a strong durable character and will rigidly support the headlights and will not be affected by the strain imposed thereon by the operating mechanism.

A further object of the invention is to provide such a mechanism which will be of a compact arrangement and attractive in appearance.

Other objects of the invention will appear as the mechanism is described in detail.

In the accompanying drawings Fig. 1 is a front elevation of an automobile showing my invention applied thereto; Fig. 2 is a plan view of a portion of the automobile frame showing my invention applied thereto and partly broken away; Fig. 3 is a side elevation of the automobile frame showing my invention applied thereto; Fig. 4 is a sectional view taken on the line 4—4 of Fig. 2; Fig. 5 is a plan view of a slightly modified embodiment of the invention; and Fig. 6 is a detail of a portion of a transversely moving steering arm.

In these drawings I have illustrated one embodiment of my invention and have shown the headlight supporting mechanism as comprising standards mounted on the respective side members of the main frame A. Each standard comprises a base 5 provided with an upwardly extending socket 6 in which is mounted an elongated bar or upright member 7 constituting the body of the standard. Mounted on the upper end of the elongated bar 7 is a top member 8 which has a downwardly extending socket 9 to receive the upper end of the bar 7 and serves to connect the headlight with the standard. The top member 8 of each standard also has a forwardly and downwardly extending socket 37 in which is mounted the upper end of a brace rod 38, the lower end of which is rigidly secured to the frame member A, and which serves to brace the standards against fore and aft vibration.

The standards are braced one against the other by means of a suitable bracing structure which is interposed between them and which also serves to support a part of the operating mechanism. As here shown, this bracing structure comprises a lower bearing 14 and an upper bearing 15, the two bearings being arranged in vertical alinement and having mounted therein a vertical shaft 16. The lower bearing 14 has laterally extending portions 17 forming sockets adapted to receive the inner ends of the brace bars 18, the outer ends of which are seated in sockets 19 carried by and extending inwardly from the base portions 5 of the respective standards. The sockets and the brace rods are inclined upwardly and inwardly so as to provide not only a rigid bracing action between the two standards but also a rigid support for the bearing. The upper bearing 15 carries a housing 20, the lower portion of which is preferbly formed integral with the bearing and the lateral portions of which constitute sockets 21. The sockets 21 receive the inner ends of brace rods 22, the outer ends of which are secured to the top members 8 of the respective standards, these standards being tubular in form to receive the end portions of the brace bars. That portion of the shaft 16 lying between the two bearings is enclosed in a tubular housing 36 which is secured at its ends to the respective bearings 14 and 15 and which serves not only to protect the shaft and prevent the entrance of dirt into the bearings but also serves as a spacing member for the bearings.

The headlights may be mounted on the supporting structure in any suitable manner and where two headlights are employed they are preferably supported by the standards and arranged adjacent thereto. In order that the headlights may be spaced apart a distance greater than the distance between the standards each standard is provided with an outwardly extending portion on which the respective headlights are mounted. As shown in Fig. 4 the brace bars 22 are provided with portions which extend outwardly beyond the tubular top members 8 of the standards and the headlights are mounted on these outwardly extending portions of the brace bars. In the present construction a split sleeve 10 is clamped rigidly onto the end of each brace bar and carries a vertical bearing 11 in which is journaled the shank or trunnion 12 of one of the headlights, which are shown at 13. In the present instance, I have employed roller bearings to support the headlights but obviously the bearings may be of any suitable character.

Rigidly secured to the upper end of the shaft 16 is a crank arm 23 which is arranged within the housing 20 and rests upon the upper end of the bearing 15. The crank arm 23 extends rearwardly and is pivotally connected with the inner ends of two connecting rods 24, the outer ends of which are pivotally connected with crank arms 25 rigidly connected with the respective headlights 13. Each connecting rod is preferably provided with means for adjusting its length, such as a turn-buckle 26. Rigidly secured to the lower end of the shaft 16 is a crank arm 27 which also extends rearwardly from the shaft and is pivotally connected with the inner end of an operating rod 28. The outer end of the rod 28 is pivotally connected, preferably by a universal joint, with the forward end of a crank arm 29 rigidly secured to the upper end of a shaft 30 journaled in a bearing bracket 31 secured to one of the frame members A of the automobile. A second crank arm 32 is rigidly secured to the lower end of the shaft 30 and has pivotally connected therewith, preferably by a universal joint, a connecting rod 33 which extends rearwardly therefrom and is operatively connected with the steering mechanism for the automobile. In the present instance, the rear end of the rod 33 is pivotally connected with an arm 34 rigidly secured to a shaft 35 forming a part of the steering mechanism and which arm has swinging movement lengthwise of the automobile, when the steering mechanism is operated. While I have shown a mechanism adapted to support two headlights it will be obvious that if it is desired to employ a single dirigible headlight this can be mounted centrally of the supporting structure and directly connected with the shaft 16.

The headlight mechanism may be applied to an automobile in which the steering arm moves transversely to the length of the automobile and when this is done a slight modification in the mechanism is required. As shown in Fig. 5 I have mounted on the side member of the frame A a pair of crank arms 40 and 41 which are rigidly secured to a vertical shaft 42 mounted in a bearing bracket 43 secured to the frame member. These crank arms constitute in effect a bell crank lever and the laterally extending arm 41 is connected by means of a rod 44 with the crank arm 32, the rod 44 being substituted for the rod 33 of Fig. 2. The forwardly extending arm 40 is connected by a rod 45 with the transversely swinging steering arm 46 by a ball and socket joint 47. The other parts of the mechanism require no change and the operation of the headlights will be the same as that effected by the mechanism heretofore described.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a dirigible headlight mechanism, a supporting structure comprising standards adaptd to be rigidly secured to a part of an automobile which is carried by the springs, brace bars secured to said standards and extending inwardly therefrom, a vertical bearing supported by the inner ends of said brace bars and serving to connect said bars one to the other, a second pair of brace bars secured to said standard and extending inwardly therefrom, a vertical bearing secured to the inner ends of the last mentioned brace bars and serving to connect said bars one to the other, a shaft journaled in said bearings, headlights supported by the respective standards, a crank arm secured to each headlight, a crank arm secured to said shaft, connecting rods connecting the last mentioned crank arm with the respective first mentioned crank arms, a second crank arm secured to said shaft, an operating rod connected with the last mentioned arm, and means adapted to be mounted on a part of said automobile which is carried by the springs for operatively connecting said operating rod with the steering mechanism of said automobile.

2. A supporting structure for dirigible headlights comprising a pair of standards, each having at its upper end a laterally extending part provided near its outer end with a bearing to support a headlight, brace bars extending inwardly from the lower ends of the respective standards, a bearing arranged at the inner ends of said brace bars and rigidly secured thereto, other brace bars carried by and extending inwardly from the upper portions of said standards, a second bearing secured to and supported by the inner ends of the last mentioned brace bars, said second bearing being arranged in line with the first mentioned bearing, a shaft journaled in said bearings, means for connecting said shaft with said headlights, and means for operatively connecting said shaft with the steering mechanism of an automobile.

3. In a supporting structure for dirigible headlights, upright standards each comprising a base having a vertically arranged socket, an elongated member mounted in said socket, a top member having a downwardly extending socket to receive the upper end of said elongated member, an inwardly extending socket carried by the base of each standard, a brace bar supported in each of the last mentioned sockets, a vertical bearing at the inner ends of said brace bars having sockets to receive the inner ends of said brace bars, other brace bars mounted in the top members of the respective standards, and extending outwardly beyond said standards, vertical bearings carried by the outwardly extending portions of said brace bars and adapted to support headlights, a bearing arranged adjacent to the inner ends of the last mentioned brace bars, sockets carried by said bearing to receive the inner ends of said last mentioned bars, a shaft journaled in the bearings at the inner ends of said brace bars, means for operatively connecting said shaft with said headlights, and means for actuating said shaft.

4. Dirigible headlight mechanism for an automobile comprising a supporting structure rigidly mounted on a part of said automobile which is carried by the springs, means for mounting a headlight on said structure, a vertical bearing carried by said supporting structure, a shaft journaled in said bearing, an operative connection between said shaft and said headlight, two pairs of bell crank levers mounted on a part of said automobile which is carried by the springs, means for connecting the two pairs of bell crank levers one to the other, an operative connection between one pair of bell crank levers and said shaft, and an operative connection between the other pair of bell crank levers and a transversely movable part of the steering mechanism of said automobile.

5. In a dirigible headlight mechanism for an automobile, a supporting structure adapted to be rigidly mounted on a part of said automobile which is carried by the springs and comprising upper and lower transverse portions, a vertical bearing carried by each transverse portion of said supporting structure, a headlight mounted on said structure for movement about a vertical axis, a shaft journaled in said bearings, means for operatively connecting said headlight with said shaft, an operating rod connected with said shaft, and means adapted to be mounted on a part of said automobile carried by the springs for operatively connecting said rod with the steering mechanism of said automobile.

6. In a dirigible headlight mechanism, a structure adapted to support a headlight and comprising standards to be secured to parts of an automobile, a pair of brace bars secured to said standards and extending inwardly therefrom, a member supported by the inner ends of said brace bars, serving to connect said bars one to the other and having a vertical bearing, a second pair of brace bars secured to said standards and extending inwardly therefrom and a member secured to the inner ends of the last mentioned brace bars, serving to connect said bars one to the other and having a vertical bearing in line with the first mentioned bearing, a shaft journaled in said bearings, a tubular housing secured to said members in line with said bearings and enclosing the intermediate portion of said shaft, means for operatively connecting said shaft with said headlight, an operating device operatively connected with said shaft, and means for operatively connecting said operating device with the steering mechanism of said automobile.

In testimony whereof, I affix my signature hereto.

GEORGE S. KECK.